US012150073B2

(12) United States Patent
Tong et al.

(10) Patent No.: US 12,150,073 B2
(45) Date of Patent: Nov. 19, 2024

(54) TRANSMIT POWER CONTROL METHOD AND APPARATUS, NODE DEVICE, AND STORAGE MEDIUM

(71) Applicant: TP-LINK CORPORATION LIMITED, Hong Kong (CN)

(72) Inventors: Di Tong, Shanghai (CN); Changqiang Wu, Shanghai (CN)

(73) Assignee: TP-LINK CORPORATION LIMITED, Hong Kong (CN)

( * ) Notice: Subject to any disclaimer, the term of this patent is extended or adjusted under 35 U.S.C. 154(b) by 0 days.

(21) Appl. No.: 18/412,489

(22) Filed: Jan. 13, 2024

(65) Prior Publication Data

US 2024/0155514 A1    May 9, 2024

Related U.S. Application Data

(63) Continuation of application No. 18/571,206, filed as application No. PCT/CN2023/073978 on Jan. 31, 2023, now abandoned.

(30) Foreign Application Priority Data

Feb. 16, 2022 (CN) .......................... 202210143379.6

(51) Int. Cl.
*H04W 52/24* (2009.01)
*H04W 52/36* (2009.01)
(52) U.S. Cl.
CPC ....... *H04W 52/367* (2013.01); *H04W 52/242* (2013.01)
(58) Field of Classification Search
CPC .. H04W 52/367; H04W 52/24; H04W 52/242
See application file for complete search history.

(56) References Cited

U.S. PATENT DOCUMENTS 9,673,956 B2 * 6/2017 Liu .................. H04W 48/16
9,749,967 B2 * 8/2017 Wang ............... H04W 74/0816
(Continued)

FOREIGN PATENT DOCUMENTS

CN    108353425 A    7/2018
CN    111095810 A    5/2020
(Continued)

OTHER PUBLICATIONS

China National Intellectual Property Administration, First Office Action, Nov. 1, 2023, 7 Pages, Beijing China.

*Primary Examiner* — Hai V Nguyen
(74) *Attorney, Agent, or Firm* — Loeb & Loeb LLP

(57) ABSTRACT

The present disclosure relates to a transmit power control method and apparatus for a node device, a node device, and a storage medium. The method includes: upon receipt of a first physical layer protocol data unit which is sent to an access point by a station of an overlapping basic service set and which can be ignored, obtaining spatial reuse parameters of a basic service set where a node device is located; calculating a first transmit power limit value according to the spatial reuse parameters; obtaining a path loss value from the access point to the node device; obtaining a minimum signal detection threshold of the access point; calculating a second transmit power limit value according to the path loss value and the minimum signal detection threshold; and adjusting the maximum transmit power according to the first transmit power limit value and the second transmit power limit value.

12 Claims, 3 Drawing Sheets

(56) References Cited

U.S. PATENT DOCUMENTS

| | | | |
|---|---|---|---|
| 10,285,203 B2* | 5/2019 | Hedayat | H04L 5/0025 |
| 10,348,394 B1* | 7/2019 | Bakr | H04B 7/2041 |
| 10,366,064 B2* | 7/2019 | Cariou | G09G 5/393 |
| 10,433,345 B2* | 10/2019 | Kim | H04W 72/0446 |
| 10,454,650 B2* | 10/2019 | Kim | H04W 52/243 |
| 10,470,128 B2* | 11/2019 | Noh | H04W 52/0229 |
| 10,470,138 B2* | 11/2019 | Kwon | H04W 52/246 |
| 10,645,724 B2* | 5/2020 | Yu | H04W 74/0808 |
| 10,677,907 B2* | 6/2020 | Orlowski | G01S 7/4802 |
| 10,743,185 B2* | 8/2020 | Xiang | H04W 74/0816 |
| 11,013,033 B2* | 5/2021 | Fischer | H04W 52/50 |
| 11,115,111 B1* | 9/2021 | Bakr | H04B 7/2041 |
| 11,122,578 B2* | 9/2021 | Zhu | H04W 52/00 |
| 11,337,085 B2* | 5/2022 | Sugaya | H04L 5/0048 |
| 11,438,925 B2* | 9/2022 | Lv | H04W 52/246 |
| 11,476,986 B2* | 10/2022 | Guo | H04L 5/0032 |
| 11,528,708 B2* | 12/2022 | Hedayat | H04W 74/02 |
| 11,570,663 B2* | 1/2023 | Dakshinkar | H04W 88/08 |
| 11,647,489 B2* | 5/2023 | Ahn | H04W 72/0446 370/329 |
| 11,665,678 B2* | 5/2023 | Li | H04W 72/02 370/329 |
| 11,671,837 B2* | 6/2023 | Wang | H04W 16/02 370/252 |
| 11,671,853 B2* | 6/2023 | Sugaya | H04B 17/0085 370/329 |
| 11,683,833 B2* | 6/2023 | Zhang | H04W 74/0808 370/336 |
| 11,700,636 B2* | 7/2023 | Lanante | H04W 74/006 370/329 |
| 11,716,758 B2* | 8/2023 | Chendamarai Kannan | H04W 74/0816 370/329 |
| 11,726,184 B2* | 8/2023 | Ferreira | H04N 25/773 356/4.01 |
| 11,729,726 B2* | 8/2023 | Chande | H04W 52/30 455/522 |
| 11,751,247 B2* | 9/2023 | Nunome | H04W 74/08 370/338 |
| 11,784,766 B2* | 10/2023 | Guo | H04W 72/21 370/329 |
| 11,805,551 B2* | 10/2023 | Sun | H04B 17/318 |
| 11,832,282 B2* | 11/2023 | Houghton | H04W 72/52 |
| 11,926,993 B2* | 3/2024 | Verma | H04W 52/367 |
| 11,943,625 B2* | 3/2024 | Park | H04B 7/0413 |
| 2016/0066257 A1* | 3/2016 | Liu | H04L 5/006 370/329 |
| 2016/0183304 A1* | 6/2016 | Fischer | H04B 17/336 370/278 |
| 2016/0249397 A1* | 8/2016 | Seok | H04L 1/0075 |
| 2017/0064644 A1* | 3/2017 | Cariou | H04W 52/243 |
| 2017/0064739 A1* | 3/2017 | Hedayat | H04L 5/0037 |
| 2017/0070862 A1 | 3/2017 | Buttolo | |
| 2017/0070962 A1* | 3/2017 | Wang | H04W 52/247 |
| 2017/0086206 A1* | 3/2017 | Wang | H04W 72/542 |
| 2017/0105217 A1* | 4/2017 | Kwon | H04W 52/245 |
| 2017/0142659 A1* | 5/2017 | Noh | H04W 52/0229 |
| 2017/0255659 A1* | 9/2017 | Cariou | H04B 7/0413 |
| 2017/0311329 A1* | 10/2017 | Barriac | H04W 74/0808 |
| 2018/0014327 A1* | 1/2018 | Park | H04W 74/006 |
| 2018/0110046 A1* | 4/2018 | Patil | H04W 72/0446 |
| 2018/0139635 A1* | 5/2018 | Oteri | H04W 24/08 |
| 2018/0249501 A1* | 8/2018 | Ko | H04W 52/245 |
| 2018/0263038 A1* | 9/2018 | Zhou | H04W 52/48 |
| 2018/0324596 A1* | 11/2018 | Xiang | H04W 74/006 |
| 2018/0343096 A1* | 11/2018 | Kim | H04L 27/2602 |
| 2019/0004166 A1* | 1/2019 | Orlowski | G01S 13/726 |
| 2019/0028898 A1* | 1/2019 | Ko | H04W 52/34 |
| 2019/0141749 A1* | 5/2019 | Seok | H04W 72/0473 |
| 2019/0182842 A1* | 6/2019 | Hu | H04L 27/2626 |
| 2019/0230703 A1* | 7/2019 | Lv | H04B 17/318 |
| 2019/0327741 A1* | 10/2019 | Li | H04W 72/0453 |
| 2020/0045637 A1* | 2/2020 | Noh | H04W 52/0229 |
| 2020/0077273 A1* | 3/2020 | Cherian | H04W 16/14 |
| 2020/0077350 A1* | 3/2020 | Gidvani | H04W 56/001 |
| 2020/0145930 A1* | 5/2020 | Park | H04W 52/383 |
| 2020/0213861 A1* | 7/2020 | Ko | H04W 52/34 |
| 2020/0404549 A1* | 12/2020 | Verma | H04W 24/10 |
| 2021/0051660 A1* | 2/2021 | Askar | H04B 7/0617 |
| 2021/0075566 A1* | 3/2021 | Guo | H04W 74/00 |
| 2021/0195540 A1* | 6/2021 | Fischer | H04W 76/15 |
| 2021/0360694 A1* | 11/2021 | Pandian | H04W 72/541 |
| 2021/0377750 A1* | 12/2021 | Sugaya | H04W 24/02 |
| 2022/0029697 A1* | 1/2022 | Bakr | H04B 7/18506 |
| 2022/0104143 A1* | 3/2022 | Chang | H04W 28/10 |
| 2022/0264336 A1* | 8/2022 | Sugaya | H04B 17/0085 |
| 2022/0338066 A1* | 10/2022 | Chitrakar | H04W 72/541 |
| 2023/0009996 A1* | 1/2023 | Ciochina | H04W 52/367 |
| 2023/0037649 A1* | 2/2023 | Lv | H04W 74/02 |
| 2023/0075377 A1* | 3/2023 | Guo | H04W 74/00 |
| 2023/0093950 A1* | 3/2023 | Demir | H01Q 19/005 370/503 |
| 2023/0189337 A1* | 6/2023 | Sun | H04B 17/318 |
| 2023/0284041 A1* | 9/2023 | Yu | H04L 5/0044 370/329 |
| 2023/0413062 A1* | 12/2023 | Park | H04L 27/2603 |
| 2023/0422043 A1* | 12/2023 | Park | H04W 16/02 |
| 2024/0064047 A1* | 2/2024 | Park | H04L 5/0091 |
| 2024/0072951 A1* | 2/2024 | Guo | H04W 74/04 |
| 2024/0073948 A1* | 2/2024 | Park | H04L 5/0096 |
| 2024/0080824 A1* | 3/2024 | Park | H04L 5/0094 |

FOREIGN PATENT DOCUMENTS

| | | | | |
|---|---|---|---|---|
| CN | 106961733 B | 11/2020 | | |
| CN | 114585066 A | 6/2022 | | |
| WO | WO-2015112780 A1 * | 7/2015 | | H04L 12/6418 |

* cited by examiner

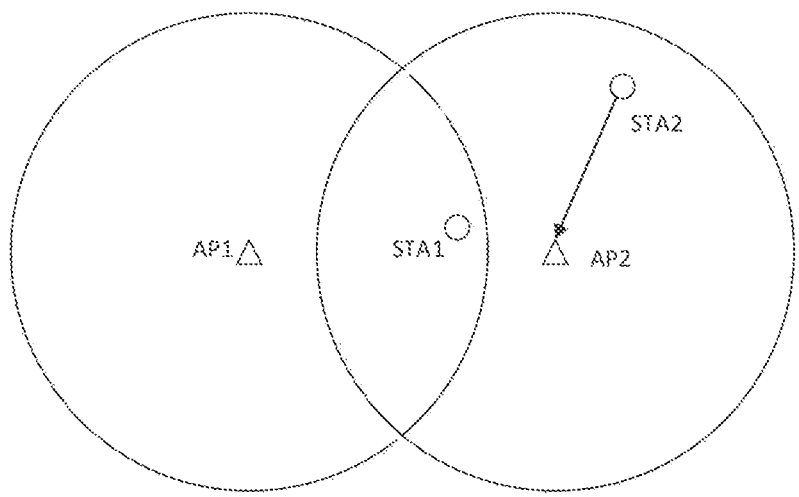
FIG. 2
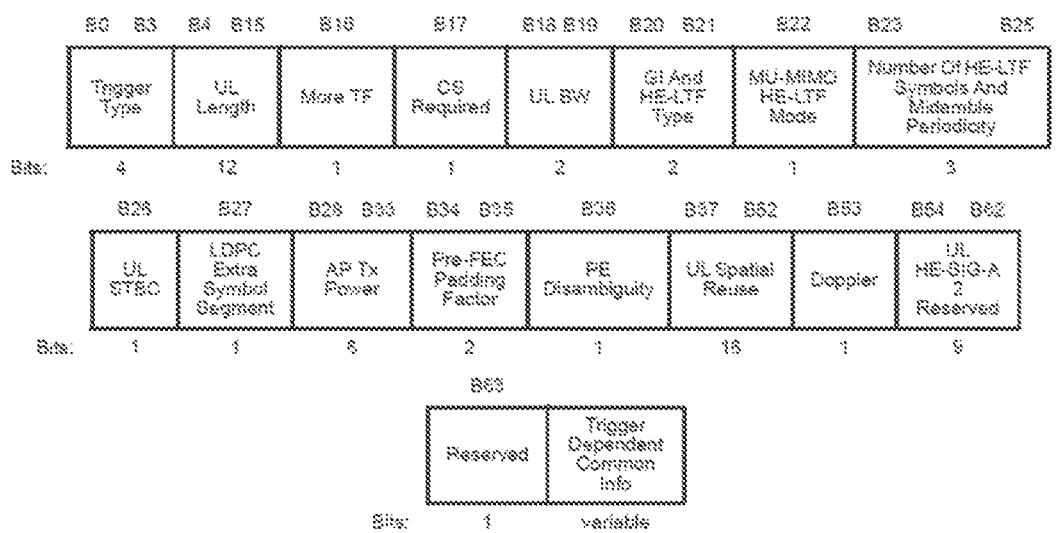
FIG. 3
FIG. 4

TRANSMIT POWER CONTROL METHOD AND APPARATUS, NODE DEVICE, AND STORAGE MEDIUM

CROSS-REFERENCE TO RELATED APPLICATION

This application is a continuation application of U.S. application Ser. No. 18/571,206 filed on Dec. 15, 2023, which is a national phase filing of International Application No. PCT/CN2023/073978 filed on Jan. 31, 2023, which claims the priority of Chinese Patent Application No. 202210143379.6 filed on Feb. 16, 2022. All the aforementioned patent applications are hereby incorporated by reference in their entireties.

TECHNICAL FIELD

The present application relates to the field of wireless communications technologies, and more particularly, to a transmitting power control method and apparatus for a node device, a node device and a computer-readable storage medium.

BACKGROUND

Spatial Reuse (SR) is introduced into the 802.11ax protocol. There are two main operation modes of SR: Overlapping Basic Service Set Packet Detect based Spatial Reuse (OBSS PD-based SR), and Parameterized Spatial Reuse based Spatial Reuse (PSR-based SR). In the OBSS PD-based SR operation, after a station of a Basic Service Set (BSS) receives a Physical Layer Protocol Data Unit (PPDU) of an Overlapping Basic Service Set (OBSS), when the signal strength of the PPDU is below a threshold, the station ignores the transmission of the PPDU and limits its own transmitting power, so as to ensure that it will not cause interference to the Station (STA) or the Access Point (AP) that sent the OBSS PPDU. However, not only the transmitter transmitting the OBSS PPDU may be affected by the interference from the BSS station, but also the receiver receiving the OBSS PPDU may be affected by the interference from the BSS station.

For example, supposing there are two overlapping basic service sets (BSSs), where in the basic service set BSS1 a STA1 is associated with an AP1, while in the basic service set BSS2 a STA2 is associated with an AP2, and the distance between the STA1 and the AP2 is very close. When the STA1 limits its own transmitting power in order not to interfere with the signal transmission of the STA2, since the distance between the STA1 and the AP2 is too short, there is a risk that the signal power of a PPDU of the STA1 is still higher than the signal detection threshold of the AP2 when the PPDU arrives to the AP2, thus the AP2 cannot ignore the PPDU from the STA1, thereby causing data transmission conflict.

SUMMARY

The present disclosure provides a transmitting power control method and apparatus executed by a node device, a node device and a computer-readable storage medium, which can effectively avoid a data transmission conflict between overlapping basic service sets in spatial reuse technologies.

In order to achieve the above objects, the embodiments of the present disclosure provide a transmitting power control method executed by a node device, including:
when receiving a negligible first physical layer protocol data unit sent by a station in an overlapping basic service set to an access point in the overlapping basic service set, acquiring a spatial reuse parameter of a basic service set to which the node device belongs;
calculating a first transmitting power limit value according to the spatial reuse parameter;
acquiring a path loss value from the access point to the node device;
acquiring a minimum signal detection threshold of the access point;
calculating a second transmitting power limit value according to the path loss value and the minimum signal detection threshold of the access point; and
adjusting a maximum transmitting power of the node device according to the first transmitting power limit value and the second transmitting power limit value.

According to an example of the present disclosure, the spatial reuse parameter includes a minimum signal detection threshold, a transmitting power reference value and a signal detection level value.

According to an example of the present disclosure, acquiring the path loss value from the access point to the node device includes: querying the path loss value from the access point to the node device from a first mapping relationship set according to a physical address of the access point recorded in the first physical layer protocol data unit; where the first mapping relationship set represents a mapping relationship between a physical address of at least one communication device including the access point and a path loss value from the at least one communication device to the node device.

According to an example of the present disclosure, before acquiring the path loss value from the access point to the node device, the first mapping relationship set is obtained via the node device by: receiving a second physical layer protocol data unit sent by the at least one communication device, and acquiring a receiving power of receiving the second physical layer protocol data unit, obtaining the path loss value from the at least one communication device to the node device according to the transmitting power recorded in the second physical layer protocol data unit and the receiving power, and adding, to the first mapping relationship set, a mapping relationship between the physical address of the at least one communication device and the path loss value from the at least one communication device to the node device.

According to an example of the present disclosure, obtaining the path loss value from the at least one communication device to the node device according to the transmitting power recorded in the second physical layer protocol data unit and the receiving power includes: calculating a difference between the transmitting power recorded in the second physical layer protocol data unit and the receiving power as the path loss value from the at least one communication device to the node device.

According to an example of the present disclosure, acquiring a minimum signal detection threshold of the access point includes: querying the minimum signal detection threshold of the access point from a second mapping relationship set according to a physical address of the access point recorded in the first physical layer protocol data unit; where the second mapping relationship set represents a mapping relationship between the physical address of at least one communication device including the access point and the minimum signal detection threshold of the at least one communication device.

According to an example of the present disclosure, before acquiring the minimum signal detection threshold of the access point, the second mapping relationship set is obtained via the node device by: receiving a third physical layer protocol data unit sent by the at least one communication device, determining a minimum signal detection threshold of the at least one communication device according to a spatial reuse parameter set in the third physical layer protocol data unit, and adding, to the second mapping relationship set, the mapping relationship between the minimum signal detection threshold of the at least one communication device and the physical address of the at least one communication device.

According to an example of the present disclosure, determining a minimum signal detection threshold of the at least one communication device according to a spatial reuse parameter set in the third physical layer protocol data unit includes: determining whether the at least one communication device and the node device are members of a same spatial reuse group according to parameters in the spatial reuse parameter set in the third physical layer protocol data unit; if they are, calculating a sum of a preset idle channel evaluation threshold and a same group signal detection offset value in the spatial reuse parameter set as the minimum signal detection threshold of the at least one communication device; if they are not, taking the preset idle channel evaluation threshold as the minimum signal detection threshold of the at least one communication device.

According to an example of the present disclosure, calculating a second transmitting power limit value according to the path loss value and the minimum signal detection threshold of the access point includes: calculating a sum of the path loss value and the minimum signal detection threshold of the access point as the second transmitting power limit value.

According to an example of the present disclosure, adjusting a maximum transmitting power of the node device according to the first transmitting power limit value and the second transmitting power limit value specifically includes: determining a smaller value from the first transmitting power limit value and the second transmitting power limit value; and adjusting the maximum transmitting power of the node device to the smaller value.

The embodiments of the present disclosure further provide a transmitting power control apparatus for a node device, including: a reuse parameter acquiring module configured to, when receiving a negligible first physical layer protocol data unit sent by a station in an overlapping basic service set to an access point in the overlapping basic service set, acquire a spatial reuse parameter of a basic service set to which the node device belongs; a first power calculating module configured to calculate a first transmitting power limit value according to the spatial reuse parameter; a path loss data acquiring module configured to acquire a path loss value from the access point to the node device; a detection threshold acquiring module configured to acquire a minimum signal detection threshold of the access point; a second power calculating module configured to calculate a second transmitting power limit value according to the path loss value and the minimum signal detection threshold of the access point; and a maximum power adjusting module configured to adjust a maximum transmitting power of the node device according to the first transmitting power limit value and the second transmitting power limit value.

The embodiments of the present disclosure further provide a node device, including: a memory; and a processor communicatively coupled to the memory and configured to: when receiving a negligible first physical layer protocol data unit sent by a station in an overlapping basic service set to an access point in the overlapping basic service set, acquire a spatial reuse parameter of a basic service set to which the node device belongs; calculate a first transmitting power limit value according to the spatial reuse parameter; acquire a path loss value from the access point to the node device; acquire a minimum signal detection threshold of the access point; calculate a second transmitting power limit value according to the path loss value and the minimum signal detection threshold of the access point; and adjust a maximum transmitting power of the node device according to the first transmitting power limit value and the second transmitting power limit value.

The embodiments of the present disclosure further provide a computer-readable storage medium, where the computer-readable storage medium includes a stored computer program, where when the computer program runs, a node device in which the computer-readable storage medium is located is controlled to: when receiving a negligible first physical layer protocol data unit sent by a station in an overlapping basic service set to an access point in the overlapping basic service set, acquire a spatial reuse parameter of a basic service set to which the node device belongs; calculate a first transmitting power limit value according to the spatial reuse parameter; acquire a path loss value from the access point to the node device; acquire a minimum signal detection threshold of the access point; calculating a second transmitting power limit value according to the path loss value and the minimum signal detection threshold of the access point; and adjust a maximum transmitting power of the node device according to the first transmitting power limit value and the second transmitting power limit value.

Compare with the prior art, any one of the invention embodiments of the present disclosure described above has the following beneficial effects:

When receiving a negligible first physical layer protocol data unit sent by a station in an overlapping basic service set to an access point in the overlapping basic service set, a spatial reuse parameter of a basic service set to which the node device belongs is acquired; where the spatial reuse parameter includes a minimum signal detection threshold, a transmitting power reference value and a signal detection level value; then, a first transmitting power limit value is calculated according to the spatial reuse parameter; thereafter, a path loss value from the access point to the node device and a minimum signal detection threshold of the access point are acquired; and a second transmitting power limit value is calculated according to the path loss value and the minimum signal detection threshold of the access point; last, a maximum transmitting power of the node device is adjusted according to the first transmitting power limit value and the second transmitting power limit value. In the embodiments of the present disclosure, the influences of a communication device both on the transmitting end in the overlapping basic service set and on the receiving end in the overlapping basic service set are considered, such that a data transmission conflict between overlapping basic service sets can be effectively avoided in the spatial reuse technologies.

BRIEF DESCRIPTION OF THE DRAWINGS

FIG. 2 is a schematic diagram of a scenario in which spatial reuse is performed in respect of two basic service sets according to an embodiment of the present disclosure;

FIG. 3 is a schematic diagram of a Common Info field format of a trigger frame provided by an embodiment of the present disclosure;

FIG. 4 is a schematic diagram of a field format of a spatial reuse parameter set provided by an embodiment of the present disclosure;

DETAILED DESCRIPTION

Hereinafter, the technical solutions in the embodiments of the present disclosure will be clearly and completely described in conjunction with the accompanying drawings. Obviously, these described embodiments are only a part of the embodiments of the present disclosure, but not all the embodiments. All other embodiments obtained by those of ordinary skill in the art based on the embodiments in the present disclosure without paying creative effort belong to the protection scope of the present disclosure.

Figure 1:
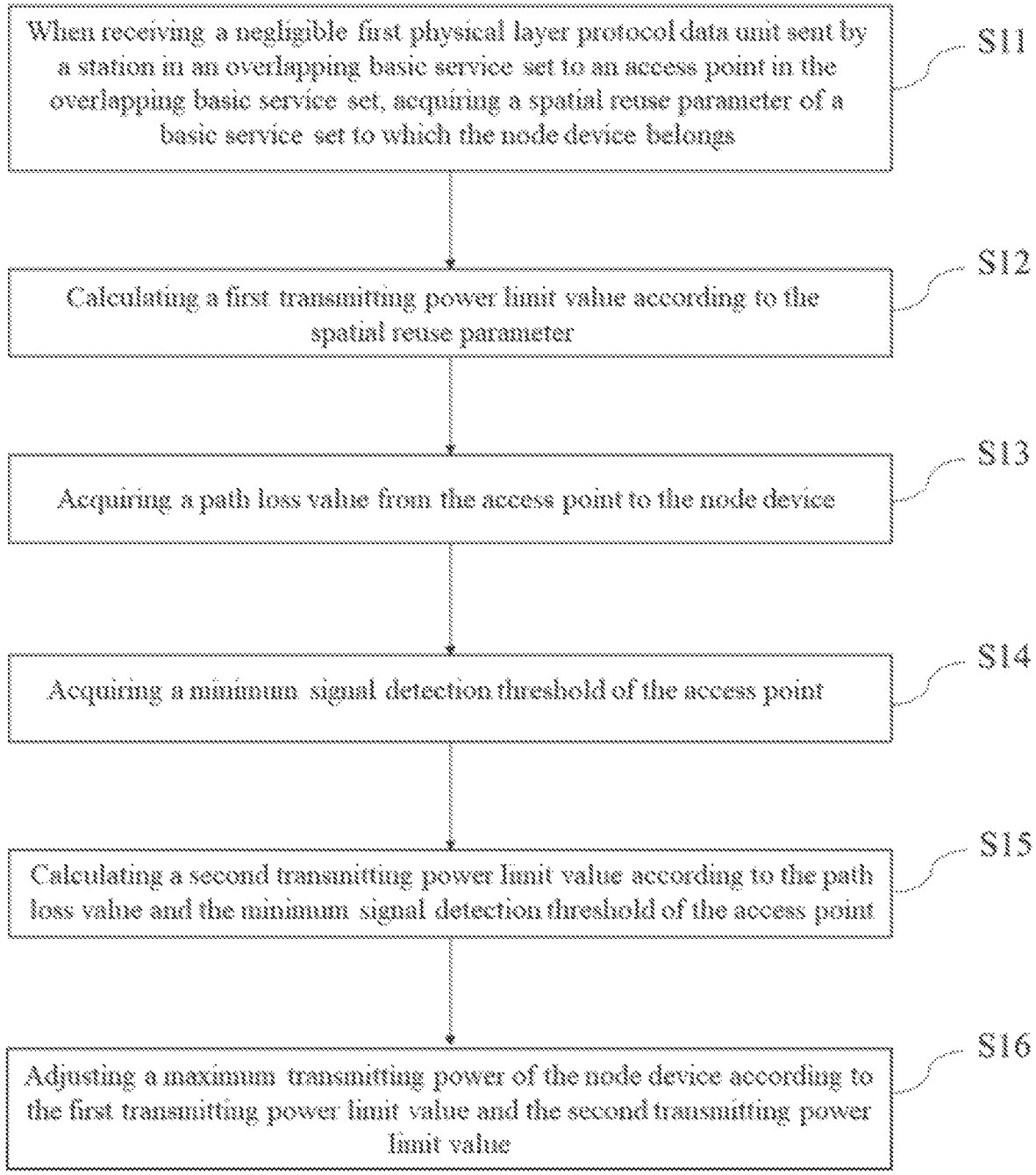
FIG. 1 is a schematic flowchart of a transmitting power control method executed by a node device provided by an embodiment of the present disclosure.

Referring to FIG. 1, FIG. 1 is a schematic flowchart of a transmitting power control method executed by a node device provided by an embodiment of the present disclosure.

The transmitting power control method executed by the node device provided by the embodiment of the present disclosure includes the following steps:

S11, when receiving a negligible first physical layer protocol data unit sent by a station in an overlapping basic service set to an access point in the overlapping basic service set, acquiring a spatial reuse parameter of a basic service set to which the node device belongs;

S12, calculating a first transmitting power limit value according to the spatial reuse parameter;

S13, acquiring a path loss value from the access point to the node device;

S14, acquiring a minimum signal detection threshold of the access point;

S15, calculating a second transmitting power limit value according to the path loss value and the minimum signal detection threshold of the access point; and S16, adjusting a maximum transmitting power of the node device according to the first transmitting power limit value and the second transmitting power limit value.

It should be noted that the above-mentioned node device may be any access point AP or station STA in the basic service set that can perform spatial reuse.

In step S11, if the PPDU received by the node device is HE single-user PPDU (HE SU PPDU), HE Extended Range Single-user PPDU (HE ER SU PPDU) or HE Multi-user PPDU (HE MU PPDU), it can be determined whether the transmitting end is a STA in an overlapping basic service set (i.e., OBSS STA) or an access point in an overlapping basic service set (i.e., OBSS AP) according to the uplink/downlink (UL/DL) field carried by the physical layer header; if the PPDU received by the node device is HE TB PPDU, it can be determined that the PPDU is sent by an OBSS STA to an OBSS AP. In addition, after the MAC address of the OBSS AP is determined, the address information can be recorded, and it can be determined whether the transmitting end of a subsequently-received frame is the OBSS STA or the OBSS AP according to the recorded address information. Here, the ignorable first physical layer protocol data unit refers to the first physical layer protocol data unit received by the node device whose signal strength is below the signal detection level threshold and thus can be ignored by the node device.

Referring to FIG. 2, it is exemplarily assumed that there are two BSSs for spatial reuse, in which in one BSS a station STA1 is associated with an access point AP1 and in the other BSS a station STA2 is associated with an access point AP2. Taking the node device as STA1 as an example, as shown in FIG. 2, the STA2 is transmitting a physical layer protocol data unit (PPDU) to AP2, and when the STA1 also receives the PPDU, assuming that the signal strength of the received PPDU is below the signal detection level value OBSS_PDlevel, the STA1 may ignore the transmission of the PPDU. If the STA1 ignores the transmission of the PPDU, in order not to interfere with the signal transmission between the STA2 and the AP2, the STA1 needs to limit its own transmitting power: on one hand, based on the 802.11ax protocol, the STA1 calculates the first transmitting power limit value according to a minimum signal detection threshold OBSS_PDmin, a signal detection level OBSS_PDlevel and a transmitting power reference value TX_PWRref of the AP1 recorded in the spatial reuse parameter transmitted by AP1, so as to ensure that the signal transmitted by the STA1 can be detected by the AP1 but also can avoid the influence of the STA1 on the STA2; on the other hand, when the distance between the STA1 and the AP2 is too close, even if the STA1 limits its own transmitting power according to the first transmitting power limit value, there is still a risk that the signal power of the PPDU transmitted by the STA1 when being transmitted to AP2 is higher than the minimum signal detection threshold of the AP2, such that the AP2 cannot ignore the PPDU from the STA1, thus causing a data transmission conflict. Because the path loss value reflects the distance between the AP2 and the STA1, it can reflect the influence on the AP2 when the STA1 performs spatial reuse. In this embodiment, the second transmitting power limit value is calculated according to the acquired path loss value and the minimum signal detection threshold of the AP2, which can ensure that the power of a signal transmitted by the STA1 is less than the minimum signal detection threshold of the AP2 when the signal reaches the AP2 after a certain path loss, so as not to be detected by the AP2, thus avoiding the influence of STA1 on AP2. Therefore, the first transmitting power limit value and the second transmitting power limit value are both considered to limit the transmitting power of the STA1, that is, not only the interference of the STA1 on the STA2 is considered, but also the interference of the STA1 on the AP2 is considered, which can effectively avoid a data transmission conflict between overlapping basic service sets in spatial reuse technologies.

Specifically, in the step S12, the spatial reuse parameter may include a minimum signal detection threshold, a transmitting power reference value and a signal detection level value, and the first transmitting power limit value TX_PWR$_{max1}$ may be calculated according to the following formula:

$$TX\_PWR_{max1} = \begin{cases} \text{unconstrained}, & \text{if } OBSS\_PD_{level} \leq OBSS\_PD_{min} \\ TX\_PWR_{ref} - (OBSS\_PD_{level} - OBSS\_PD_{min}), & \text{if } OBSS\_PD_{max} \geq ; \\ & OBSS\_PD_{level} \geq \\ & OBSS\_PD_{min} \end{cases}$$

where TX_PWR$_{ref}$ is the transmitting power reference value of the basic service set to which the node device belongs, OBSS_PD$_{level}$ is the signal detection level value of the basic service set to which the node device belongs, $OBSS\_PD_{min}$ is the minimum signal detection threshold of the basic service set to which the node device belongs, and $OBSS\_PD_{max}$ is the maximum signal detection threshold of the basic service set to which the node device belongs.

In some better embodiments, the step S13 specifically includes:

querying the path loss value from the access point to the node device from a first mapping relationship set according to a physical address of the access point recorded in the first physical layer protocol data unit; where the first mapping relationship set represents a mapping relationship between a physical address of at least one communication device including the access point and a path loss value from the at least one communication device to the node device.

Here, the first mapping relationship set may be previously recorded by the node device by means of receiving and measuring frames from the at least one communication device including the access point. Specifically, before acquiring the path loss value from the access point to the node device (i.e., before the above step S13), the first mapping relationship set may be obtained via the node device by: receiving a second physical layer protocol data unit sent by the at least one communication device, and acquiring a receiving power of receiving the second physical layer protocol data unit, obtaining the path loss value from the at least one communication device to the node device according to the transmitting power recorded in the second physical layer protocol data unit and the receiving power, and adding, to the first mapping relationship set, a mapping relationship between the physical address of the at least one communication device and the path loss value from the at least one communication device to the node device.

In a specific example, the node device may calculate the path loss value accordingly by receiving the trigger frame sent by at least one communication device and obtaining the power at which this trigger frame is sent according to the field in the trigger frame. For example, referring to FIG. 3, FIG. 3 shows a schematic diagram of a Common Info field format of a trigger frame provided by an embodiment of the present disclosure. In this embodiment, the second physical layer protocol data unit sent by at least one communication device may contain a trigger frame, thus the node device can know the transmitting power at which the trigger frame is sent by the at least one communication device according to the AP Tx Power subfield in the Common Info field in the received trigger frame, and then obtain the path loss value from the access point to the node device according to the receiving power when the node device receives the trigger frame. It can be understood that the greater the path loss value from at least one communication device to the node device is, the farther the distance from the at least one communication device to the node device.

It should be noted that when the node device is a station (STA), since the trigger frame will only be sent by the access point, if the node device receives the physical layer protocol data unit containing the trigger frame and the transmitter address is not the physical address of the access point which is associated by the node device, it can be determined that the physical layer protocol data unit is from the access point in an overlapping basic service set; and when the node device is an access point (AP), the physical layer protocol data unit containing the trigger frame received by the node device can only come from the access point in the overlapping basic service set.

In some better embodiments, obtaining the path loss value from the at least one communication device to the node device according to the transmitting power recorded in the second physical layer protocol data unit and the receiving power specifically is:

calculating a difference between the transmitting power recorded in the second physical layer protocol data unit and the receiving power as the path loss value from the at least one communication device to the node device.

In a specific embodiment, the step S14 specifically includes:

querying the minimum signal detection threshold of the access point from a second mapping relationship set according to a physical address of the access point recorded in the first physical layer protocol data unit; where the second mapping relationship set represents a mapping relationship between the physical address of at least one communication device including the access point and the minimum signal detection threshold of the at least one communication device.

Here, the second mapping relationship set may be previously recorded by the node device by means of receiving a frame from at least one communication device including an access point. Specifically, before acquiring the minimum signal detection threshold of the access point (i.e., before the above step S14), the second mapping relationship set may be obtained via the node device by: receiving a third physical layer protocol data unit sent by the at least one communication device, determining a minimum signal detection threshold of the at least one communication device according to a spatial reuse parameter set in the third physical layer protocol data unit, and adding, to the second mapping relationship set, the mapping relationship between the minimum signal detection threshold of the at least one communication device and the physical address of the at least one communication device.

Furthermore, determining a minimum signal detection threshold of the at least one communication device according to a spatial reuse parameter set in the third physical layer protocol data unit includes:

determining whether the at least one communication device and the node device are members of a same spatial reuse group according to parameters in the spatial reuse parameter set in the third physical layer protocol data unit; if they are, calculating a sum of a preset idle channel evaluation threshold and a same group signal detection offset value in the spatial reuse parameter set as the minimum signal detection threshold of the at least one communication device; if they are not, taking the preset idle channel evaluation threshold as the minimum signal detection threshold of the at least one communication device.

It should be noted that the method for determining the minimum signal detection threshold of the basic service set to which the node device belongs is the same as that for determining the minimum signal detection threshold of the at least one communication device, and the details are not repeated here.

It is worth noting that the spatial reuse parameter set is usually located in the Beacon frame, the Probe Response frame and the (Re)Association Response frame of the physical layer protocol data unit. The OBSS PD-based spatial reuse operation mainly includes two types: the first type is OBSS PD-based spatial reuse operation based on group members of non-spatial reuse group (non-SRG); the second type is OBSS PD-based spatial reuse operation based on group members of Spatial Reuse Group (SRG). According to the embodiment of the present disclosure, different minimum signal detection thresholds may be obtained according to different OBSS PD-based spatial reuse operation types, and then different second transmitting power limit values may be calculated accordingly. Specifically, referring to FIG. 4, in an example, whether the at least one communication device and the node device are members of a same spatial reuse group may be determined according to at least one of a SR Control field, a SRG BSS Color Bitmap field and a SRG Partial BSSID Bitmap field in the spatial reuse parameter set, and the same group signal detection offset value can be obtained from a SRG OBSS PD Min Offset field in the spatial reuse parameter set. It should be noted that the SRG OBSS PD Min Offset field does not always exist, and it is mainly indicated by the SRG Information Present subfield in the SR Control field in the spatial reuse parameter set, with 1 indicating existence and 0 indicating non-existence. If the value of the SRG Information Present subfield is 0, it can be determined that at least one communication device and the node device are not members of a same spatial reuse group, and the preset idle channel evaluation threshold is taken as the minimum signal detection threshold of at least one communication device. In addition, the SRG Information Present subfield is also used to indicate whether there are the SRG BSS Color Bitmap field and the SRG Partial BSSID Bitmap field, while the SRG BSS Color Bitmap field and the SRG Partial BSSID Bitmap field are used to indicate which BSS are members of the spatial reuse group. Therefore, if the value of the SRG Information Present subfield is 1, it can be further determined whether the at least one communication device and the node device are members of a same spatial reuse group according to the indication of the SRG BSS Color Bitmap field or the SRG Partial BSSID Bitmap field, and if they are, a sum of the preset idle channel evaluation threshold and the same group signal detection offset value obtained from the SRG OBSS PD Min Offset field is calculated as the minimum signal detection threshold of the at least one communication device.

Preferably, the preset idle channel evaluation threshold may be −82 dBm.

Specifically, the step S15 is:
calculating a sum of the path loss value and the minimum signal detection threshold of the access point as the second transmitting power limit value.

In some preferred embodiments, the step S16 specifically includes:
determining a smaller value from the first transmitting power limit value and the second transmitting power limit value; and
adjusting the maximum transmitting power of the node device to the smaller value It can be understood that the path loss value not only can reflect the distance between the access point OBSS AP and the node device in the overlapping basic service set, but also can reflect the impact on OBSS AP caused by the spatial reuse of the node device. When the node device receives the OBSS PPDU sent to the OBSS AP by the OBSS STA according to OBSS PD-based spatial reuse technologies, a second transmitting power limit value can be obtained by using the pre-recorded path loss value from the OBSS AP to the node device and the minimum signal detection threshold of the OBSS AP in addition to that the transmitting power of the node device is limited according to the first transmitting power limit value. If the second transmitting power limit value is less than the first transmitting power limit value, the transmitting power of the node device is further limited by the second transmitting power limit value. In the OBSS PD-based spatial reuse operation, the node device can neither affect the transmitter nor the receiver in overlapping basic service sets, thus a data transmission conflict between overlapping basic service sets is effectively avoided.

A transmitting power control method executed by a node device of the present disclosure is described below through a specific embodiment.

Step 1: when a node device (STA or AP) receives a physical layer protocol data unit PPDU containing a trigger frame sent by an access point OBSS AP in an overlapping basic service set, it learns the transmitting power TX_PWR at which the OBSS AP transmits this trigger frame according to the AP TX Power subfield in the Common Info field in the trigger frame; then, the path loss value PL from OBSS AP to the node device is obtained according to the received power RX_PWR when the trigger frame is received; where the calculating formula of the road loss value PL is as follows:

$$PL = TX\_PWR - RX\_PWR;$$

Step 2: after obtaining the path loss value from OBSS AP to the node device through step 1, the mapping relationship between the OBSS AP MAC addresses of different OBSS APS and their path loss values are recorded by referring to the manner in Table 1:

TABLE 1

| OBSS AP MAC Address | Value of Path Loss |
|---|---|
| OBSS AP1 | PL1 |
| OBSS AP2 | PL2 |
| OBSS AP3 | PL3 |

Step 3: referring to Table 2, a column of minimum signal detection threshold OBSS PD Min is added on the basis of Table 1. The OBSS PD Min item is recorded as −82 when the node device does not receive the PPDU that carries a spatial reuse parameter set sent by OBSS AP;

TABLE 2

| OBSS AP MAC Address | Value of Path Loss | OBSS PD Min (dBm) |
|---|---|---|
| OBSS AP1 | PL1 | −82 |
| OBSS AP2 | PL2 | |
| OBSS AP3 | PL3 | |

Referring to Table 3, the node device checks the SRG Information Present value according to the SR Control field in the spatial reuse parameter set when the node device receives the PPDU that carries a spatial reuse parameter set sent by OBSS AP. If the SRG Information Present value is 0, the OBSS PD Min item is recorded as −82;

TABLE 3

| OBSS AP MAC Address | Value of Path Loss | OBSS PD Min (dBm) |
|---|---|---|
| OBSS AP1 | PL1 | −82 |
| OBSS AP2 | PL2 | |
| OBSS AP3 | PL3 | |

Referring to Table 4, if the SRG Information Present value is 1, but the node device is not a SRG member of the OBSS AP according to the indication of the SRG BSS Color Bitmap field or the SRG Partial BSSID Bitmap field, then the OBSS PD Min item is recorded as −82;

TABLE 4

| OBSS AP MAC Address | Value of Path Loss | OBSS PD Min (dBm) |
| --- | --- | --- |
| OBSS AP1 | PL1 | −82 |
| OBSS AP2 | PL2 | |
| OBSS AP3 | PL3 | |

Referring to Table 5, if the SRG Information Present value is 1, and the node device is a SRG member of the OBSS AP according to the indication of the SRG BSS Color Bitmap field or the SRG Partial BSSID Bitmap field, the OBSS PD Min item is recorded as −82+SRG OBSS PD Min Offset.

TABLE 5

| OBSS AP MAC Address | Value of Path Loss | OBSS PD Min (dBm) |
| --- | --- | --- |
| OBSS AP1 | PL1 | −82 + SRG OBSS PD Min Offset |
| OBSS AP2 | PL2 | |
| OBSS AP3 | PL3 | |

Step 4, when the node device receives a certain OBSS PPDU, and its receiving address is the same as a certain OBSS AP MAC address recorded in Table 2, the OBSS PPDU is ignored according to the OBSS PD-based spatial reuse technologies and a first transmitting power limit value $TX\_PWR_{max1}$ is obtained. On this basis, the path loss value PL and the minimum signal detection threshold OBSS PD Min corresponding to this address is found according to the MAC address recorded in the received OBSS PPDU, and the second transmitting power limit $TX\_PWR_{max2}$ is calculated according to the following formula:

$$TX\_PWR_{max2} = OBSS\ PD\ Min + PL.$$

It should be noted that the second transmitting power limit value $TX\_PWR_{max2}$ can ensure that the signal power reaching the OBSS AP is below OBSS PD Min, thus ensuring that the node device will not affect the OBSS AP.

Step 5: the maximum transmitting power $TX\_PWR_{max}$ that the node device can use next is determined according to the following formula:

$$TX\_PWR_{max} = \min(TX\_PWR_{max1}, TX\_PWR_{max2}).$$

Correspondingly, the embodiments of the present disclosure further provide a transmitting power control apparatus for a node device, which can implement all the processes of the transmitting power control method for the communication device as described.

Figure 5:
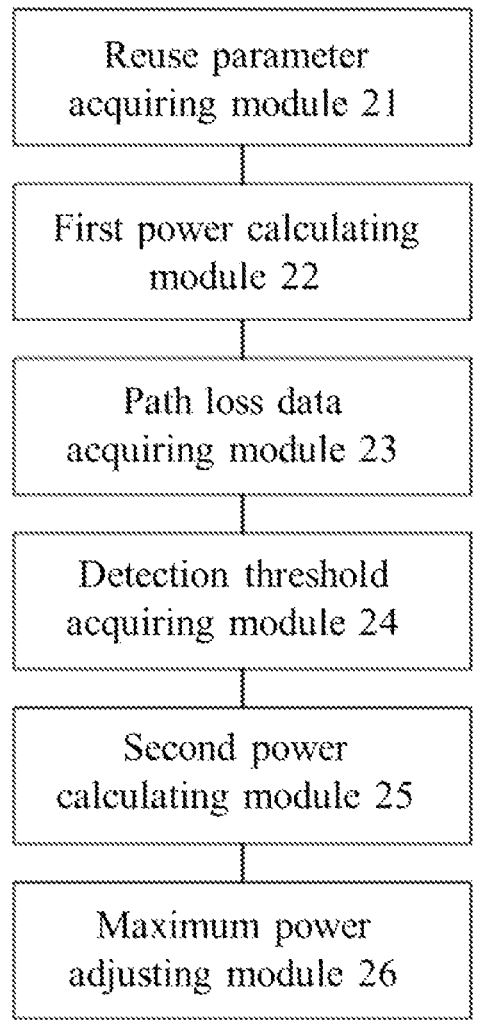
FIG. 5 is a schematic structural diagram of a transmitting power control apparatus for a communication device provided by an embodiment of the present disclosure.

Referring to FIG. 5, FIG. 5 is a structural schematic diagram of a transmitting power control apparatus for a node device provided by an embodiment of the present disclosure.

The transmitting power control apparatus for a node device provided by the embodiment of the present disclosure includes:

a reuse parameter acquiring module 21 configured to, when receiving a negligible first physical layer protocol data unit sent by a station in an overlapping basic service set to an access point in the overlapping basic service set, acquire a spatial reuse parameter of a basic service set to which the node device belongs;

a first power calculating module 22 configured to calculate a first transmitting power limit value according to the spatial reuse parameter;

a path loss data acquiring module 23 configured to acquire a path loss value from the access point to the node device;

a detection threshold acquiring module 24 configured to acquire a minimum signal detection threshold of the access point;

a second power calculating module 25 configured to calculate a second transmitting power limit value according to the path loss value and the minimum signal detection threshold of the access point; and a maximum power adjusting module 26 configured to adjust a maximum transmitting power of the node device according to the first transmitting power limit value and the second transmitting power limit value.

Here, the spatial reuse parameter may include a minimum signal detection threshold, a transmitting power reference value and a signal detection level value.

As an optional embodiment, the path loss data acquiring module 23 specifically includes:

a path loss querying unit configured to query the path loss value from the access point to the node device from a first mapping relationship set according to a physical address of the access point recorded in the first physical layer protocol data unit; where the first mapping relationship set represents a mapping relationship between a physical address of at least one communication device including the access point and a path loss value from the at least one communication device to the node device;

a path loss updating unit configured to obtain the first mapping relationship set via the node device based on the following modes before acquiring the path loss value from the access point to the node device: receiving a second physical layer protocol data unit sent by the at least one communication device, and acquiring a receiving power of receiving the second physical layer protocol data unit, obtaining the path loss value from the at least one communication device to the node device according to the transmitting power recorded in the second physical layer protocol data unit and the receiving power, and adding, to the first mapping relationship set, a mapping relationship between the physical address of the at least one communication device and the path loss value from the at least one communication device to the node device.

Furthermore, the path loss update unit configured to obtain the path loss value from the at least one communication device to the node device according to the transmitting power recorded in the second physical layer protocol data unit and the receiving power specifically is:

calculating a difference between the transmitting power recorded in the second physical layer protocol data unit and the receiving power as the path loss value from the at least one communication device to the node device.

As one of the better embodiments, the detection threshold acquiring module 24 specifically includes:

a threshold querying unit configured to query the minimum signal detection threshold of the access point from a second mapping relationship set according to a physical address of the access point recorded in the first physical layer protocol data unit; where the second mapping relationship set represents a mapping relationship between the physical address of at least one communication device including the access point and the minimum signal detection threshold of the at least one communication device;

a threshold update unit configured to obtain the second mapping relationship set via the node device based on the following modes before the minimum signal detection threshold of the access point is acquired: receiving a third physical layer protocol data unit sent by the at least one communication device, determining a minimum signal detection threshold of the at least one communication device according to a spatial reuse parameter set in the third physical layer protocol data unit, and adding, to the second mapping relationship set, the mapping relationship between the minimum signal detection threshold of the at least one communication device and the physical address of the at least one communication device.

Preferably, the threshold update unit configured to determine a minimum signal detection threshold of the at least one communication device according to a spatial reuse parameter set in the third physical layer protocol data unit includes:

determining whether the at least one communication device and the node device are members of a same spatial reuse group according to parameters in the spatial reuse parameter set in the third physical layer protocol data unit: if they are, calculating a sum of a preset idle channel evaluation threshold and a same group signal detection offset value in the spatial reuse parameter set as the minimum signal detection threshold of the at least one communication device; if they are not, taking the preset idle channel evaluation threshold as the minimum signal detection threshold of the at least one communication device.

Furthermore, the threshold update unit configured to calculate a second transmitting power limit value according to the path loss value and the minimum signal detection threshold of the access point specifically is:

calculating a sum of the path loss value and the minimum signal detection threshold of the access point as the second transmitting power limit value.

As an optional embodiment, the second power calculating module 25 is specifically configured to:

determine a smaller value from the first transmitting power limit value and the second transmitting power limit value; and adjust the maximum transmitting power of the node device to the smaller value.

It should be noted that as for the related detailed descriptions and beneficial effects of respective embodiments of the transmitting power control apparatus for a communication device of this embodiment, the detailed specific descriptions and beneficial effects of respective embodiments of the transmitting power control method for a communication device described above can be referenced, and details will not be repeated here.

It should be noted that the apparatus embodiments described above are only schematic, where the units described as separate components may or may not be physically separated, and the components displayed as units may or may not be physical units, that is, they may be located in one place or distributed on multiple network units. Some or all of the modules may be selected according to actual needs so as to achieve the purpose of this embodiment. In addition, in the accompanying drawings of the apparatus embodiments provided by the present disclosure, the connection relationship between modules indicates that they have communication connection, which can be specifically realized as one or more communication buses or signal lines. Those of ordinary skill in the art can understand and implement without paying creative effort.

Figure 6:
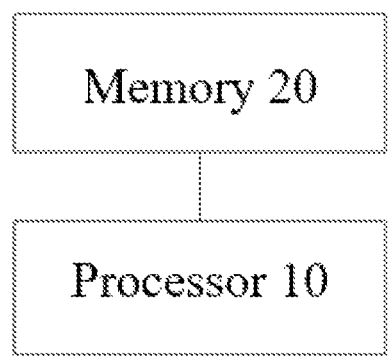
FIG. 6 is a structural block diagram of a terminal device provided by an embodiment of the present disclosure.

The embodiments of the present disclosure further provide a node device, referring to FIG. 6, FIG. 6 is a schematic diagram of a node device provided by an embodiment of the present disclosure.

A node device provided by an embodiment of the present disclosure includes a processor 10 and a memory 20, and the processor 10 is communicatively coupled to the memory 20 and configured to: when receiving a negligible first physical layer protocol data unit sent by a station in an overlapping basic service set to an access point in the overlapping basic service set, acquire a spatial reuse parameter of a basic service set to which the node device belongs; calculate a first transmitting power limit value according to the spatial reuse parameter: acquire a path loss value from the access point to the node device; acquire a minimum signal detection threshold of the access point; calculate a second transmitting power limit value according to the path loss value and the minimum signal detection threshold of the access point: and adjust a maximum transmitting power of the node device according to the first transmitting power limit value and the second transmitting power limit value.

The processor 10 can further implement the steps in the embodiments of the transmitting power control method described above, for example, all steps of the transmitting power control method executed by the node device shown in FIG. 1. Alternatively, the processor 10 can further realize the functions of respective modules/units in the embodiments of the transmitting power control apparatus for a node device described above, for example, the functions of respective modules of the transmitting power control apparatus for a communication device shown in FIG. 5.

The node device may be a station (STA) or an access point (AP). The terminal device may include, but is not limited to, a processor 10 and a memory 20. It can be understood by those skilled in the art that the schematic diagram is only an example of a terminal device, does not constitute a limitation to the node device, and may include more or less components than those in the schematic diagram, or combine some components, or different components. For example, the node device may further include an input and output device, a network access device, a bus, and the like.

The processor 10 may be a Central Processing Unit (CPU), and may also be other general processor, Digital Signal Processor (DSP), application specific integrated circuit (ASIC), Field-Programmable Gate Array (FPGA) or other programmable logic device, discrete gate or transistor logic device, discrete hardware component, etc. The general processor may be a microprocessor or any conventional processor, etc. The processor 10 is the control center of the terminal device and connects all parts of the whole terminal device with various interfaces and lines.

The memory 20 can be used to store computer programs and/or modules, and the processor 10 can realize various functions of the terminal device by running or executing the computer programs and/or modules stored in the memory 20 and calling the data stored in the memory 20. The memory 20 may mainly include a storage program area and a storage data area, where the storage program area may store an operating system, an application program required by at least one function, and the like; the storage data area may store data created according to the use of the terminal device, etc. In addition, the memory may include a high-speed random access memory, and may also include a non-volatile memory, such as a hard disk, a memory, a plug-in hard disk, a Smart Media Card (SMC), a Secure Digital (SD) card, a Flash card, at least one disk memory device, a flash memory device, or other volatile solid-state memory devices.

Here, the module/unit integrated with the node device may be stored in a computer-readable storage medium if it is realized in the form of a software functional unit and sold or used as an independent product. Based on this understanding, all or part of the processes in the methods of the above embodiments may also be realized by instructing related hardware through a computer program, the computer program may be stored in a computer-readable storage medium, and when executed by a processor, the computer program can realize the steps of the above methods. Here, the computer program includes a computer program code, which may be in the form of a source code, an object code, an executable file or some intermediate forms etc. The computer-readable medium may include any entity or device capable of carrying a computer program code, a recording medium, a U disk, a mobile hard disk, a magnetic disk, an optical disk, a computer memory, a Read-Only Memory (ROM), a Random Access Memory (RAM), an electric carrier signal, a telecommunication signal, a software distribution medium, etc.

Correspondingly, the embodiments of the present disclosure further provide a computer-readable storage medium, which includes a stored computer program; where when the computer program runs, a node device where the computer-readable storage medium is located is controlled to execute the following steps: when receiving a negligible first physical layer protocol data unit sent by a station in an overlapping basic service set to an access point in the overlapping basic service set, acquiring a spatial reuse parameter of a basic service set to which the node device belongs; calculating a first transmitting power limit value according to the spatial reuse parameter; acquiring a path loss value from the access point to the node device; acquiring a minimum signal detection threshold of the access point; calculating a second transmitting power limit value according to the path loss value and the minimum signal detection threshold of the access point; and adjusting a maximum transmitting power of the node device according to the first transmitting power limit value and the second transmitting power limit value.

To sum up, with the transmitting power control method executed by a node device, the transmitting power control apparatus, the node device and the computer-readable storage medium provided by the embodiments of the present disclosure, first, when receiving a negligible first physical layer protocol data unit sent by a station in an overlapping basic service set to an access point in the overlapping basic service set, a spatial reuse parameter of a basic service set to which the node device belongs is acquired; where the spatial reuse parameter includes a minimum signal detection threshold, a transmitting power reference value and a signal detection level value; second, a first transmitting power limit value is calculated according to the spatial reuse parameter, thereafter, a path loss value from the access point to the node device and a minimum signal detection threshold of the access point are acquired; and a second transmitting power limit value is calculated according to the path loss value and the minimum signal detection threshold of the access point; last, a maximum transmitting power of the node device is adjusted according to the first transmitting power limit value and the second transmitting power limit value. In the embodiments of the present disclosure, the influences of a communication device both on the transmitting end in a overlapping basic service set and on the receiving end in the overlapping basic service set are considered, such that a data transmission conflict between overlapping basic service sets can be effectively avoided in the spatial reuse technologies.

The above described is the preferred embodiments of the present disclosure, and it should be pointed out that those skilled in the art can make several improvements and modifications without departing from the principles of the present disclosure, and these improvements and modifications are also regarded as falling into the protection scope of the present disclosure.

The invention claimed is:

1. A transmitting power control method executed by a node device, comprising:
   when receiving a negligible first physical layer protocol data unit sent by a station in an overlapping basic service set to an access point in the overlapping basic service set, acquiring a spatial reuse parameter of a basic service set to which the node device belongs;
   calculating a first transmitting power limit value according to the spatial reuse parameter;
   acquiring a path loss value from the access point to the node device;
   acquiring a minimum signal detection threshold of the access point;
   calculating a second transmitting power limit value according to the path loss value and the minimum signal detection threshold of the access point; and
   adjusting a maximum transmitting power of the node device according to the first transmitting power limit value and the second transmitting power limit value.

2. The method of claim 1, wherein the spatial reuse parameter includes a minimum signal detection threshold, a transmitting power reference value and a signal detection level value.

3. The method of claim 1, wherein acquiring the path loss value from the access point to the node device comprises:
   querying the path loss value from the access point to the node device from a first mapping relationship set according to a physical address of the access point recorded in the first physical layer protocol data unit; wherein the first mapping relationship set represents a mapping relationship between a physical address of at least one communication device including the access point and a path loss value from the at least one communication device to the node device.

4. The method of claim 3, wherein before acquiring the path loss value from the access point to the node device, the first mapping relationship set is obtained via the node device by:
   receiving a second physical layer protocol data unit sent by the at least one communication device, and acquiring a receiving power of receiving the second physical layer protocol data unit, obtaining the path loss value from the at least one communication device to the node device according to the transmitting power recorded in the second physical layer protocol data unit and the receiving power, and adding, to the first mapping relationship set, a mapping relationship between the physical address of the at least one communication device and the path loss value from the at least one communication device to the node device.

5. The method of claim 4, wherein obtaining the path loss value from the at least one communication device to the node device according to the transmitting power recorded in the second physical layer protocol data unit and the receiving power comprises:
   calculating a difference between the transmitting power recorded in the second physical layer protocol data unit and the receiving power as the path loss value from the at least one communication device to the node device.

6. The method of claim 1, wherein acquiring the minimum signal detection threshold of the access point comprises:
querying the minimum signal detection threshold of the access point from a second mapping relationship set according to a physical address of the access point recorded in the first physical layer protocol data unit; wherein the second mapping relationship set represents a mapping relationship between the physical address of at least one communication device including the access point and the minimum signal detection threshold of the at least one communication device.

7. The method of claim 6, wherein, before acquiring the minimum signal detection threshold of the access point, the second mapping relationship set is obtained via the node device by:
receiving a third physical layer protocol data unit sent by the at least one communication device, determining a minimum signal detection threshold of the at least one communication device according to a spatial reuse parameter set in the third physical layer protocol data unit, and adding, to the second mapping relationship set, the mapping relationship between the minimum signal detection threshold of the at least one communication device and the physical address of the at least one communication device.

8. The method of claim 7, wherein determining the minimum signal detection threshold of the at least one communication device according to the spatial reuse parameter set in the third physical layer protocol data unit comprises:
determining whether the at least one communication device and the node device are members of a same spatial reuse group according to parameters in the spatial reuse parameter set in the third physical layer protocol data unit; if they are, calculating a sum of a preset idle channel evaluation threshold and a same group signal detection offset value in the spatial reuse parameter set as the minimum signal detection threshold of the at least one communication device; if they are not, taking the preset idle channel evaluation threshold as the minimum signal detection threshold of the at least one communication device.

9. The method of claim 1, wherein calculating the second transmitting power limit value according to the path loss value and the minimum signal detection threshold of the access point comprises:
calculating a sum of the path loss value and the minimum signal detection threshold of the access point as the second transmitting power limit value.

10. The method of claim 1, wherein adjusting the maximum transmitting power of the node device according to the first transmitting power limit value and the second transmitting power limit value comprises:
determining a smaller value from the first transmitting power limit value and the second transmitting power limit value; and
adjusting the maximum transmitting power of the node device to the smaller value.

11. A node device, comprising:
a memory; and
a processor communicatively coupled to the memory and configured to:
when receiving a negligible first physical layer protocol data unit sent by a station in an overlapping basic service set to an access point in the overlapping basic service set, acquire a spatial reuse parameter of a basic service set to which the node device belongs;
calculate a first transmitting power limit value according to the spatial reuse parameter;
acquire a path loss value from the access point to the node device;
acquire a minimum signal detection threshold of the access point;
calculate a second transmitting power limit value according to the path loss value and the minimum signal detection threshold of the access point; and
adjust a maximum transmitting power of the node device according to the first transmitting power limit value and the second transmitting power limit value.

12. A non-transitory computer-readable storage medium, wherein the non-transitory computer-readable storage medium comprises a stored computer program, wherein when the computer program runs, a node device where the non-transitory computer-readable storage medium is located is controlled to:
when receiving a negligible first physical layer protocol data unit sent by a station in an overlapping basic service set to an access point in the overlapping basic service set, acquire a spatial reuse parameter of a basic service set to which the node device belongs;
calculate a first transmitting power limit value according to the spatial reuse parameter;
acquire a path loss value from the access point to the node device;
acquire a minimum signal detection threshold of the access point;
calculate a second transmitting power limit value according to the path loss value and the minimum signal detection threshold of the access point; and
adjust a maximum transmitting power of the node device according to the first transmitting power limit value and the second transmitting power limit value.

* * * * *